US012695986B2

(12) United States Patent
Takao

(10) Patent No.: US 12,695,986 B2
(45) Date of Patent: Jul. 28, 2026

(54) IMAGE PICKUP APPARATUS, FOCUS DETECTING METHOD, AND STORAGE MEDIUM

(71) Applicant: CANON KABUSHIKI KAISHA, Tokyo (JP)

(72) Inventor: Yumi Takao, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 36 days.

(21) Appl. No.: 18/788,243

(22) Filed: Jul. 30, 2024

(65) Prior Publication Data

US 2025/0047978 A1 Feb. 6, 2025

(30) Foreign Application Priority Data

Aug. 2, 2023 (JP) ................................. 2023-126030

(51) Int. Cl.
*H04N 23/67* (2023.01)
*G03B 13/36* (2021.01)
(Continued)

(52) U.S. Cl.
CPC ........... *H04N 23/671* (2023.01); *G03B 13/36* (2013.01); *H04N 13/218* (2018.05); *H04N 23/54* (2023.01);
(Continued)

(58) Field of Classification Search
CPC ........ H04N 23/54; H04N 23/55; H04N 23/67; H04N 23/671; H04N 23/672;
(Continued)

(56) References Cited

U.S. PATENT DOCUMENTS

2005/0110890 A1* 5/2005 Sasaki ...................... G02B 7/38
348/E5.045
2013/0335533 A1* 12/2013 Yamazaki ............ H04N 13/218
348/49
(Continued)

FOREIGN PATENT DOCUMENTS

JP 2005062728 A * 3/2005 ............... G02B 7/28
JP 2008-268403 A 11/2008
JP 2011-205558 A 10/2011

OTHER PUBLICATIONS

Extended European Search Report issued by the European Patent Office on Mar. 17, 2025 in corresponding EP Patent Application No. 24192278.0.

(Continued)

*Primary Examiner* — Twyler L Haskins
*Assistant Examiner* — Akshay Trehan
(74) *Attorney, Agent, or Firm* — Carter, DeLuca & Farrell LLP

(57) ABSTRACT

An image pickup apparatus includes an image sensor configured to capture an object image formed by an imaging optical system, and to acquire a first pair of signals generated by light beams that have passed areas in an exit pupil that are different from each other and arranged in a first direction and a second pair of signals generated by light beams that have passed areas in the exit pupil that are different each other and arranged in a second direction different from the first direction, and a selector configured to select a direction to be used for focus control of the imaging optical system among the first direction and the second direction.

14 Claims, 9 Drawing Sheets

(51) Int. Cl.
  *H04N 13/218*    (2018.01)
  *H04N 23/54*    (2023.01)
  *H04N 23/55*    (2023.01)
  *H04N 25/704*    (2023.01)

(52) U.S. Cl.
  CPC ........... *H04N 23/55* (2023.01); *H04N 23/672*
        (2023.01); *H04N 25/704* (2023.01)

(58) Field of Classification Search
  CPC ......... H04N 23/675; H04N 23/62–633; H04N
        25/704; H04N 13/218; G03B 13/36
  See application file for complete search history.

(56)             References Cited

U.S. PATENT DOCUMENTS

2019/0289235 A1*  9/2019  Nakamura ............. H04N 25/11
2022/0385875 A1   12/2022  Oshima
2022/0400208 A1*  12/2022  Takao .................. H04N 23/635

OTHER PUBLICATIONS

Partial European Search Report issued by the European Patent
Office on Nov. 26, 2024 in corresponding EP Patent Application No.
24192278.0.

* cited by examiner

S1401 — ACQUIRE PAIR OF FOCUS DETECTING SIGNAL

S1402 — PIXEL ADDITION PROCESSING

S1403 — SHADING CORRECTION PROCESSING

S1404 — FILTER PROCESSING

S1405 — CALCULATE CORRELATION VALUE

S1406 — CALCULATE DEF

301L   OPTICAL AXIS          OPTICAL AXIS   301R

CENTER OF IMAGE SENSOR   211

IMAGE PICKUP APPARATUS, FOCUS DETECTING METHOD, AND STORAGE MEDIUM

BACKGROUND

Technical Field

One of the aspects of the embodiments relates to a focus detecting method in an image pickup apparatus.

Description of Related Art

Autofocus (AF) using a phase-difference detecting method for moving a focus lens to obtain an in-focus state based on a focus detecting result (defocus amount) of an imaging optical system includes an imaging-surface phase-difference AF for using as a focus detecting sensor an image sensor configured to generate a captured image. The imaging-surface phase-difference AF calculates a defocus amount using a relative image shift amount between a pair of optical images formed by light beams that have passed through different areas of the exit pupil in the imaging optical system, a correction value, and a conversion coefficient (conversion factor) that depend on the imaging optical system. The correction value and conversion coefficient are determined using information about an incident light angle from the imaging optical system to the image sensor and a light shield state by the imaging optical system, as disclosed, for example, in Japanese Patent Laid-Open No. 2008-268403.

Some imaging optical systems have two optical systems arranged in parallel on the left and right sides to obtain two captured images with parallax that can be stereoscopically viewed. Some image pickup apparatuses, as disclosed in Japanese Patent Laid-Open No. 2011-205558, use a single image sensor to capture two optical images formed by two optical systems arranged in parallel.

In a case where two optical images formed by two optical systems arranged in parallel are captured by a single image sensor, the optical axes of the two optical systems are offset from the center of the image sensor. In this case, a method similar to that of Japanese Patent Laid-open No. 2008-268403, which assumes a general imaging optical system in which the optical axis of one optical system passes through the center of the image sensor, cannot be used to calculate a proper correction value and conversion coefficient. As a result, a highly accurate defocus amount cannot be obtained and excellent AF cannot be performed.

SUMMARY

An image pickup apparatus according to one aspect of the disclosure includes an image sensor configured to capture an object image formed by an imaging optical system, and to acquire a first pair of signals generated by light beams that have passed areas in an exit pupil that are different from each other and arranged in a first direction and a second pair of signals generated by light beams that have passed areas in the exit pupil that are different each other and arranged in a second direction different from the first direction, and a selector configured to select a direction to be used for focus control of the imaging optical system among the first direction and the second direction. A focus detecting method corresponding to the image pickup apparatus also constitutes another aspect of the disclosure. A storage medium storing a program that causes a computer to execute the above focus detecting method also constitutes another aspect of the disclosure.

Further features of various embodiments of the disclosure will become apparent from the following description of embodiments with reference to the attached drawings.

DESCRIPTION OF THE EMBODIMENTS

In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. A memory contains instructions or programs that, when executed by the CPU, cause the CPU to perform operations corresponding to units or functions. In the hardware context, the term "unit" refers to a hardware element, a circuit, an assembly, a physical structure, a system, a module, or a subsystem. Depending on the specific embodiment, the term "unit" may include mechanical, optical, or electrical components, or any combination of them. The term "unit" may include active (e.g., transistors) or passive (e.g., capacitor) components. The term "unit" may include semiconductor devices having a substrate and other layers of materials having various concentrations of conductivity. It may include a CPU or a programmable processor that can execute a program stored in a memory to perform specified functions. The term "unit" may include logic elements (e.g., AND, OR) implemented by transistor circuits or any other switching circuits. In the combination of software and hardware contexts, the term "unit" or "circuit" refers to any combination of the software and hardware contexts as described above. In addition, the term "element," "assembly," "component," or "device" may also refer to "circuit" with or without integration with packaging materials.

Referring now to the accompanying drawings, a detailed description will be given of embodiments according to the disclosure.

Example 1

Camera External Configuration

Figure 1A:
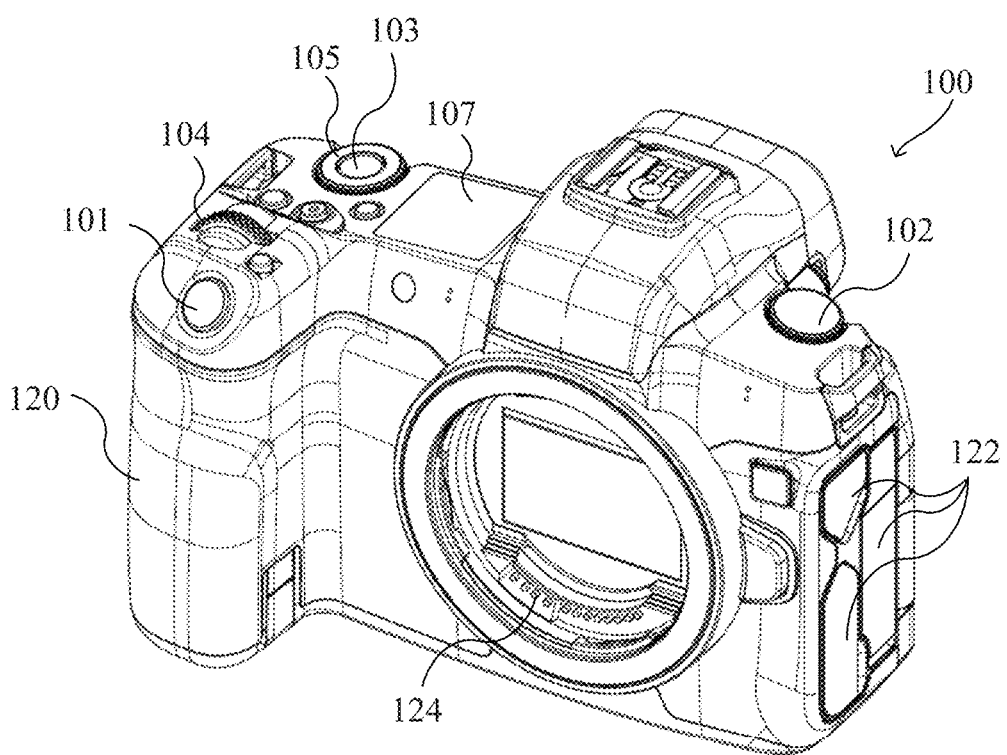
FIGS. 1A and 1B illustrate the appearance of a camera according to Example 1.
Figure 1B:
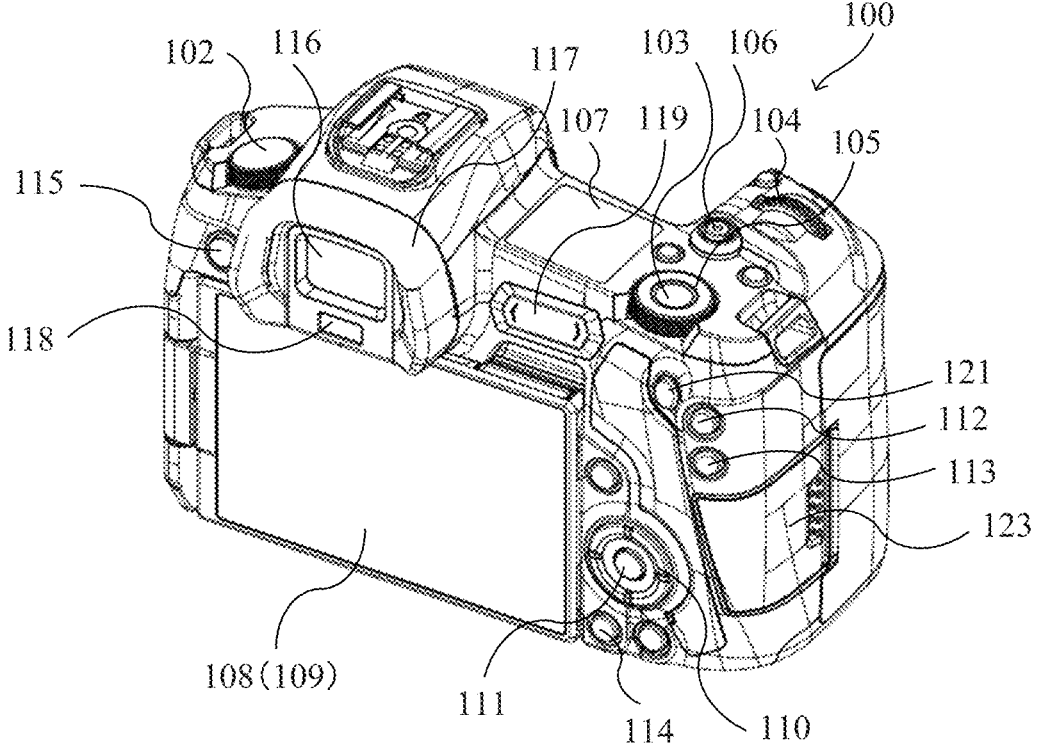

FIGS. 1A and 1B illustrate the external appearance of a digital camera 100 (referred to as a camera hereinafter) as an image pickup apparatus according to Example 1. FIG. 1A illustrates the camera 100 diagonally viewed from the front, and FIG. 1B illustrates the camera 100 diagonally viewed from the back.

The camera 100 includes a shutter button 101, a power switch 102, a mode switch 103, a main electronic dial 104, a sub electronic dial 105, and a moving image button 106 each serving as an operation unit on its top surface, and further includes an extra-finder display unit 107. The shutter button 101 is operated by the user to prepare for imaging and to issue an imaging instruction. The power switch 102 is operated by the user to power on and off the camera 100. The mode switch 103 is operated by the user to switch an operation mode of the camera 100. The main electronic dial 104 is rotated by the user to change a setting value such as a shutter speed and F-number (aperture value). The sub electronic dial 105 is rotated by the user in order to move a selection frame (cursor), image feed, and the like. The moving image button 106 is operated by the user to instruct to start or stop capturing (recording) a moving image. The extra-finder display unit 107 displays various setting values such as a shutter speed and F-number.

The camera 100 further includes a display unit 108, a touch panel 109, a direction key 110, a setting button 111, an AE lock button 112, an enlargement button 113, a playback button 114, a menu button 115, and a touch bar 119 each serving as an operation unit on its back. The camera 100 further includes an eyepiece portion 116 and an eye proximity detector 118 on the back. The display unit 108 displays an image and various information. The touch panel 109 detects a user's touch operation on the display surface (touch operation surface) of the display unit 108. The direction key 110 includes operable keys (four-directional keys) disposed at the top, bottom, left, and right, and can give instructions according to the position of the operated key. The setting button 111 is mainly operated by the user in determining a selection item. The AE lock button 112 is operated by the user to fix an exposure state in the imaging standby state.

The enlargement button 113 is operated by the user to switch between turning on and turning off of a live-view (LV) display magnification mode in the imaging mode. By operating the main electronic dial 104 in the enlargement mode, the displayed LV image is enlarged or reduced. The enlargement button 113 is also operated by the user in enlarging a reproduced image or increasing the enlargement ratio in the reproduction mode.

The playback button 114 is operated by the user to switch between the imaging mode and the playback mode. In a case where the playback button 114 is operated in the imaging mode, the mode shifts to the playback mode, and the latest image among images recorded on the recording medium 228, which will be described later, can be displayed on the display unit 108. The menu button 115 is operated by the user in displaying a menu screen on the display unit 108 on which various settings can be made. The user can intuitively perform various settings using the menu screen displayed on the display unit 108, the direction key 110, and the setting button 111.

The eyepiece portion 116 is a part through which the user peeps through the eyepiece finder (peeping type finder) 117. The user can visually recognize an image displayed on an internal Electronic View Finder (EVF) 217, which will be described later, through the eyepiece portion 116. The eye proximity detector 118 is a sensor that detects whether or not the user's eye is close to the eyepiece portion 116.

The touch bar 119 is a line-shaped touch operation unit (line touch sensor) that can accept a touch operation. The touch bar 119 is disposed at a position where the touch bar 119 can be touched with the thumb of the user's right hand while the user holds a grip portion 120 of the camera 100 with the right hand. Thereby, the user can touch the shutter button 101 with the thumb of the right hand while peeping through the eyepiece finder 117 with the user's eye fixed on the eyepiece portion 116. The touch bar 119 can accept a tap operation (an operation of touching and releasing without moving for a predetermined period), a sliding operation to the left or right (a touch and moving operation), and the like. The touch bar 119 is an operation unit different from the touch panel 109 and does not have a display function. In this embodiment, the touch bar 119 functions as a multi-function bar.

The camera 100 further includes the grip portion 120, a thumb rest portion 121, a terminal cover 122, a lid 123, and a communication terminal 124 described above. The grip portion 120 is a holder formed in a shape that is easy to grip with the right hand when the user holds the camera 100. The shutter button 101 and the main electronic dial 104 are disposed at positions where they can be operated with the index finger of the right hand while the user holds the camera 100 by gripping the grip portion 120 with the little finger, ring finger, and middle finger of the right hand. In the same state, the sub electronic dial 105 and the touch bar 119 are disposed at positions that can be operated with the thumb of the user's right hand. The thumb rest portion 121 is provided at a position where the right thumb can easily be placed while the user grips the grip portion 120 without operating any of the operation units provided on the back surface of the camera 100. The thumb rest portion 121 is made of a rubber member or the like to increase the holding force (grip feeling).

The terminal cover 122 protects a connector for a connection cable that connects the camera 100 to an external device. The lid 123 protects a recording medium 228 and a slot by closing the slot for storing the recording medium 228, which will be described later. The communication terminal 124 is a terminal for communicating with a lens unit 200, which will be described later, attachable to and detachable from the camera 100.

Internal Configuration of Camera

Figure 2:
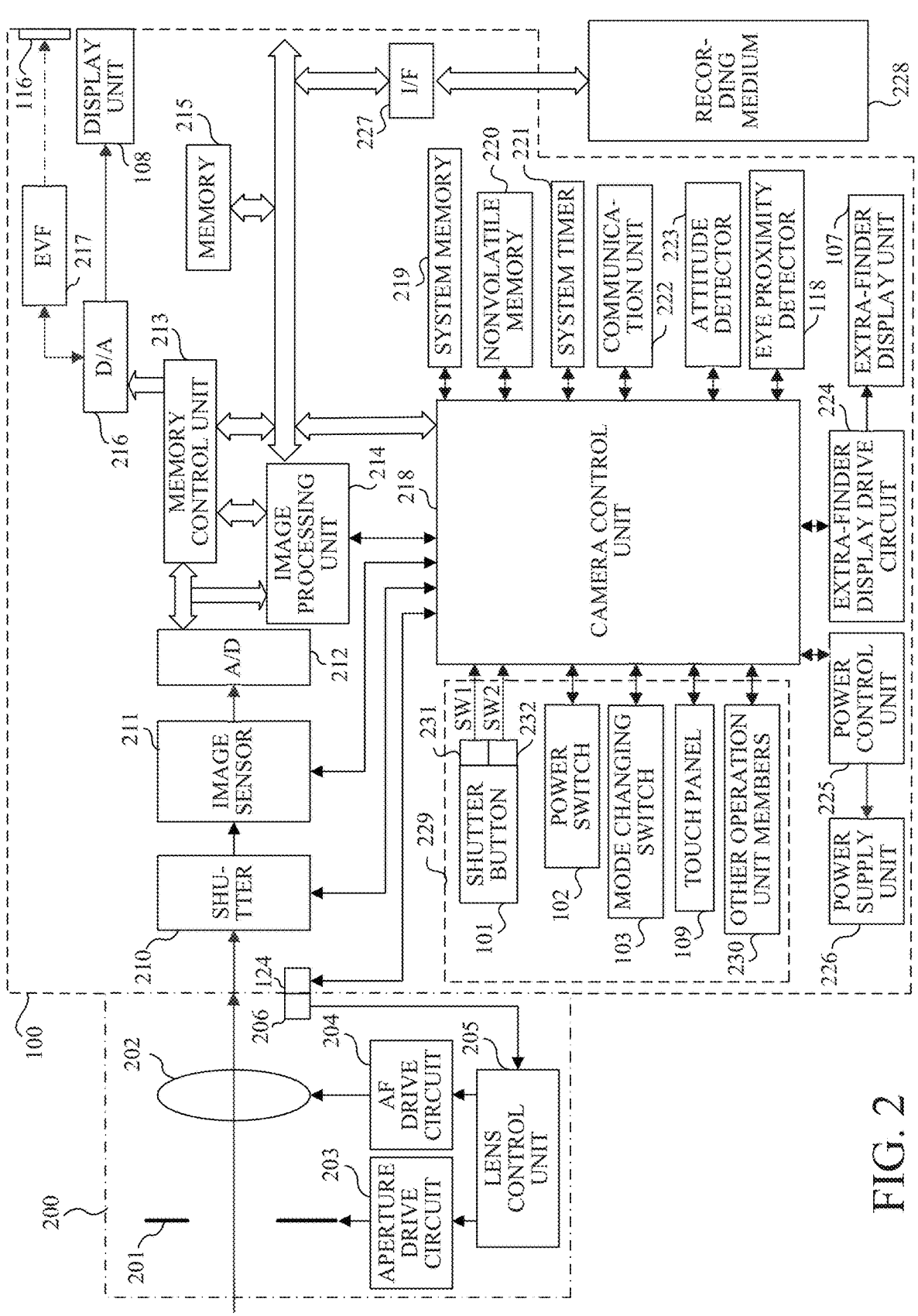
FIG. 2 illustrates the internal configuration of the camera according to Example 1.

FIG. 2 illustrates the internal configuration of the camera 100. Those elements in FIG. 2, which are corresponding elements in FIGS. 1A and 1B, will be designated by the same reference numerals. The lens unit 200 as an interchangeable lens is detachably attached to the camera 100.

The lens unit 200 is a type of interchangeable lens attachable to and detachable from the camera 100. Although the lens unit 200 has an imaging optical system including two optical systems described later, FIG. 2 only illustrates the configuration of one of the optical systems. The lens unit 200 includes an aperture stop (diaphragm) 201, a lens 202, an aperture drive circuit 203, an AF drive circuit 204, a lens control unit 205, and a communication terminal 206.

Although not illustrated, the lens 202 as one optical system includes a plurality of lens units.

The aperture stop 201 is configured so that its aperture diameter is variable in order to adjust a light amount. The aperture drive circuit 203 drives the aperture stop 201. The AF drive circuit 204 moves the focus lens included in the lens 202 for focusing. The lens control unit 205 can communicate with the camera 100 via the communication terminal 206 of the lens unit 200 and the communication terminal 124 of the camera 100, and controls the aperture drive circuit 203 and the AF drive circuit 204 based on instructions from a camera control unit 218, which will be described later.

The camera 100 includes a shutter 210, an image sensor 211, an A/D converter 212, a memory control unit 213, an image processing unit 214, a memory 215, a D/A converter 216, the EVF 217, the display unit 108, and the camera control unit 218.

The shutter 210 is a focal plane shutter that controls the exposure time of the image sensor 211 by opening and closing based on instructions from the camera control unit 218. The image sensor 211 includes a photoelectric conversion element such as a CCD sensor or a CMOS sensor that converts an optical image into an electric signal. The image sensor 211 also serves as a focus detecting sensor for performing imaging-surface phase-difference AF.

The A/D converter 212 converts an imaging signal as an analog signal output from the image sensor 211 into imaging data as a digital signal. The image processing unit 214 performs image processing such as pixel interpolation, resizing processing, and color conversion processing for the image data from the A/D converter 212 or the memory control unit 213 to generate image data. The image processing unit 214 performs predetermined calculation processing using image data. The camera control unit 218 performs auto-exposure (AE) processing and AF processing based on the calculation result obtained by the image processing unit 214. Furthermore, the image processing unit 214 performs auto white balance (AWB) processing for the image data.

Imaging data from the A/D converter 212 is written to the memory 215 via the image processing unit 214 and the memory control unit 213, or written to the memory 215 via the memory control unit 213 but not via the image processing unit 214. The memory 215 stores imaging data and image data to be displayed on the display unit 108 and the EVF 217. The memory 215 stores a predetermined number of still images, moving images and audio data for a predetermined period of time. The memory 215 also serves as an image display memory (video memory).

The D/A converter 216 converts the display image data stored in the memory 215 into an analog signal and supplies it to the display unit 108 and the EVF 217. The display unit 108 and the EVF 217 perform display according to the analog signal from the D/A converter 216. Thereby, LV display, which is the display of a live-view (LV) image, is performed. The display unit 108 and the EVF 217 are configured with display devices such as an LCD and an organic EL, and live-view display is performed.

The camera control unit 218 is a computer configured with one or more processors and circuits. The camera control unit 218 controls the camera 100 and lens unit 200. The camera control unit 218 executes each processing illustrated in a flowchart described later in accordance with a program recorded in a nonvolatile memory (NVM) 220. The camera control unit 218 also controls the memory 215, the D/A converter 216, the display unit 108, and the EVF 217 to control image display.

The camera 100 further includes a system memory 219, the nonvolatile memory 220, a system timer 221, a communication unit 222, an attitude detector 223, and the eye proximity detector 118. For example, a RAM is used as the system memory 219, which stores constants and variables for the operation of the camera control unit 218. Furthermore, programs read from the nonvolatile memory 220 are loaded in the system memory 219. The nonvolatile memory 220 is an electrically erasable/recordable memory, such as an EEPROM. The nonvolatile memory 220 stores constants, programs, etc. for the operation of the camera control unit 218.

The system timer 221 measures the time for various controls and the time of a built-in clock. The communication unit 222 transmits and receives image data, audio data, etc. to and from an external device connected wirelessly or via a wired cable. The communication unit 222 can also be connected to a wireless LAN (Local Area Network) and the Internet. Furthermore, the communication unit 222 can communicate with an external device using Bluetooth (registered trademark) or Bluetooth Low Energy.

The attitude detector 223 detects the attitude (or orientation) of the camera 100 relative to the gravity direction. The camera control unit 218 determines, based on the attitude detected by the attitude detector 223, whether the attitude of the camera 100 during imaging for generating image data is a horizontal attitude (normal attitude) or a vertical attitude. The camera control unit 218 can add attitude information to the image data according to the attitude detected by the attitude detector 223, or can rotate and record the image data according to the detected attitude. The attitude detector 223 includes an acceleration sensor, a gyro sensor, or the like. Motion (pan, tilt, etc.) of the camera 100 can be detected through the attitude detector 223.

The eye proximity detector 118 detects the approach of an object (the user's face) to the eyepiece portion 116 of the eyepiece finder 117 incorporating the EVF 217. The eye proximity detector 118 includes, for example, an infrared proximity sensor. In this case, an infrared ray emitted from the light projector of the infrared proximity sensor is reflected by a nearby object and received by a light receiver of the infrared proximity sensor. A distance from the eyepiece portion 116 to the object can be determined based on a received infrared light amount. The camera control unit 218 switches between displaying and non-displaying of the display unit 108 and the EVF 217 depending on the state detected by the eye proximity detector 118.

The camera 100 also includes an extra-finder display unit 107, an extra-finder display drive circuit 224, a power control unit 225, a power supply unit 226, a recording medium interface (I/F) 227, and an operation unit 229. The extra-finder display unit 107 is driven by the extra-finder display drive circuit 224 and displays various setting values such as a shutter speed and F-number. The power control unit 225 includes a battery detecting circuit, a DC-DC converter, a switch circuit for switching the blocks to be energized, and the like, and detects whether or not a battery is attached, the type of battery, the remaining battery level, and the like. The power control unit 225 also controls the DC-DC converter based on the detection result and instruction from the camera control unit 218, and supplies necessary voltage to each component including the recording medium 228 for a necessary period.

The power supply unit 226 is composed of primary batteries such as alkaline batteries and lithium batteries, secondary batteries such as NiCd batteries, NiMH batteries, and Li batteries, and an AC adapter. The recording medium I/F 227 is an interface with a recording medium 228 such as a semiconductor memory or a magnetic disk. The recording medium 228 records image data and audio data generated by imaging. The recording medium 228 may be removably attached to the camera 100 or may be built into the camera 100.

The operation unit 229 is an input unit that accepts an operation by the user (user operations), and inputs an instruction according to the user operation to the camera control unit 218. The operation unit 229 includes the shutter button 101, power switch 102, mode switch 103, touch panel 109, and other operation members 230. The other operation members 230 include the main electronic dial 104, sub electronic dial 105, moving image button 106, direction key 110, setting button 111, AE lock button 112, enlargement button 113, playback button 114, menu button 115, and touch bar 119, etc.

The shutter button 101 has a first shutter switch 231 and a second shutter switch 232. The first shutter switch 231 is turned on when the user half-presses the shutter button 101, and generates first shutter switch signal SW1. In a case where the first shutter switch signal SW1 is input, the camera control unit 218 starts imaging preparation processing such as AF processing, AE processing, and AWB processing. The second shutter switch 232 is turned on by fully pressing the shutter button 101, and generates second shutter switch signal SW2. In a case where the camera control unit 218 receives the second shutter switch signal SW2, it starts a series of imaging processing from reading out the signal from the image sensor 211 to generating image data and writing it into the recording medium 228.

The mode switch 103 is operated by the user to switch the operation mode of the camera control unit 218 to one of a still image capturing mode, a moving image capturing mode, and a playback mode. The touch panel 109 is a touch sensor that detects a user's touch operation on the display surface of the display unit 108. The touch panel 109 can use touch sensors of various types, such as a resistive film type, a capacitive type, a surface acoustic wave type, an infrared type, an electromagnetic induction type, an image recognition type, and an optical sensor type.

Configuration of Lens Unit

Figure 3:
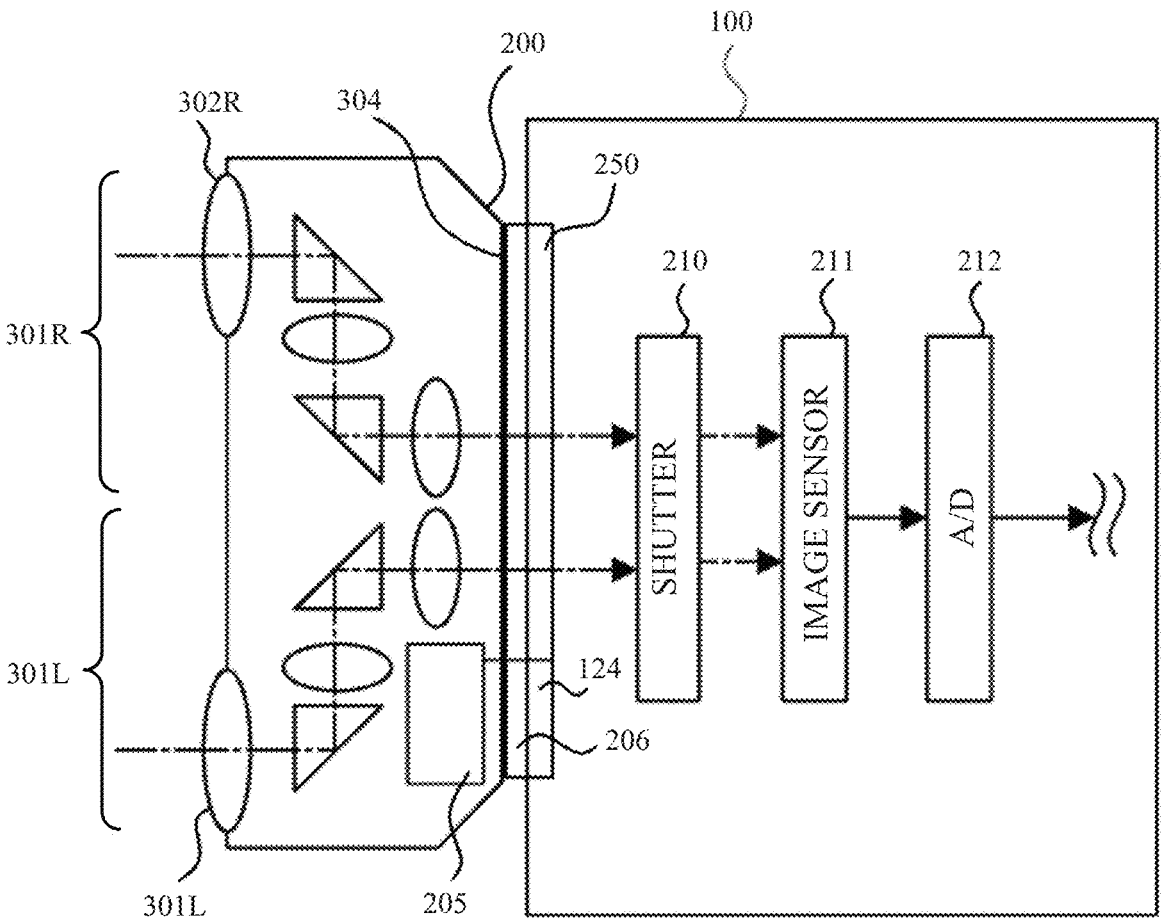
FIG. 3 illustrates the configuration of a lens unit according to Example 1.

FIG. 3 illustrates the detailed configuration of the imaging optical system of the lens unit 200 when viewed from above. The lens unit 200 is attached to the camera 100, and those elements in FIG. 3, which are corresponding elements of the camera 100 in FIG. 2, will be designated by the same reference numerals. The lens unit 200 includes a lens control unit 205 illustrated in FIG. 2.

The lens unit 200 is attached to the camera 100 by mechanically coupling a lens mount unit 304 provided on the lens unit 200 to a camera mount unit 250 provided on the camera 100. In a case where the lens unit 200 is attached to the camera 100, the communication terminal 206 of the lens unit 200 is electrically connected to the communication terminal 124 of the camera 100, and communication between the lens control unit 205 and the camera control unit 218 is enabled.

The imaging optical system is a twin-lens type (stereoscopic type) imaging optical system having a left-eye optical system 301L and a right-eye optical system 301R as two optical systems arranged in parallel on the left and right (top and bottom in FIG. 3). Each optical system is a VR180 style fisheye lens with a wide viewing angle of approximately 180 degrees. However, a lens having a viewing angle of about 160 degrees narrower than 180 degrees may be used.

Figure 8:
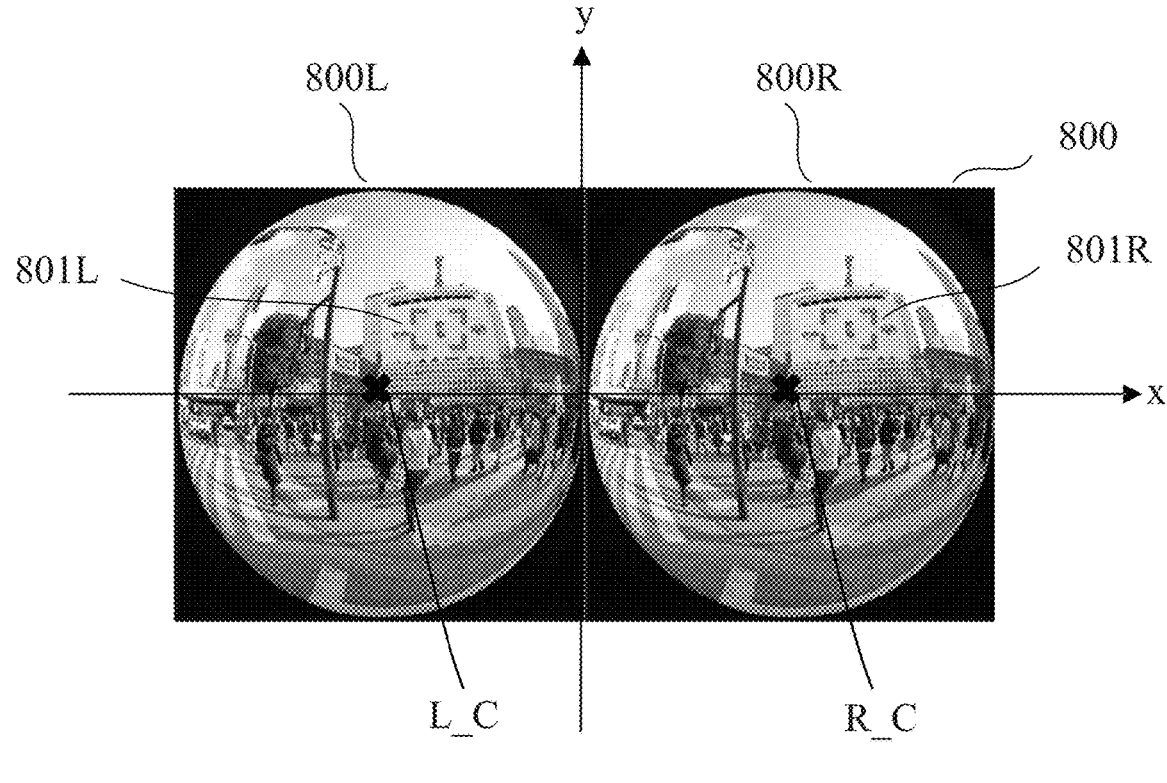
FIG. 8 illustrates an example of two optical images formed on the image sensor according to Example 1.

The left-eye optical system 301L and the right-eye optical system 301R each include a plurality of lenses, two reflective mirrors (prisms), and the aperture stop illustrated in FIG. 2 (omitted in FIG. 3). The object-side lenses of the left-eye optical system 301L and the right-eye optical system 301R are arranged so that their optical axes are separated from each other by a predetermined distance (base length), and the image-side lenses are arranged so that their optical axes are separated from each other by a distance shorter than the base length. In each optical system, two prisms are arranged between the object-side lens and the image-side lens, and the light from the object-side lens is bent by reflection by the two prisms and guided to the image-side lens. As illustrated in FIG. 8, the left-eye optical system 301L and the right-eye optical system 301R each capture a left-eye optical image and a right-eye optical image that have parallax from each other are formed in left area 800L and right area 800R on a single image sensor (imaging surface 800) provided in the camera 100. In an imaging optical system consisting of a single optical system, its optical axis coincides with the center of the image sensor, whereas in this embodiment, the optical-axes positions L_C and R_C of the image-side lenses of the left-eye optical system 301L and right-eye optical system 301R are shifted to the left and right from the center of the image sensor (at the intersection of the x-axis and the y-axis), respectively.

The lens unit 200 can provide the AF processing of the camera control unit 218 described above, and focusing by the user's focus operation, and includes an unillustrated focus ring for performing the focus operation. Two focus rings may be provided to adjust the focus of the left-eye optical system 301L and the right-eye optical system 301R, or a single focus ring may be provided for providing integral focusing of the left-eye optical system 301L and the right-eye optical system 301R.

Image Sensor Configuration

Figures 4, 5A, 5B:
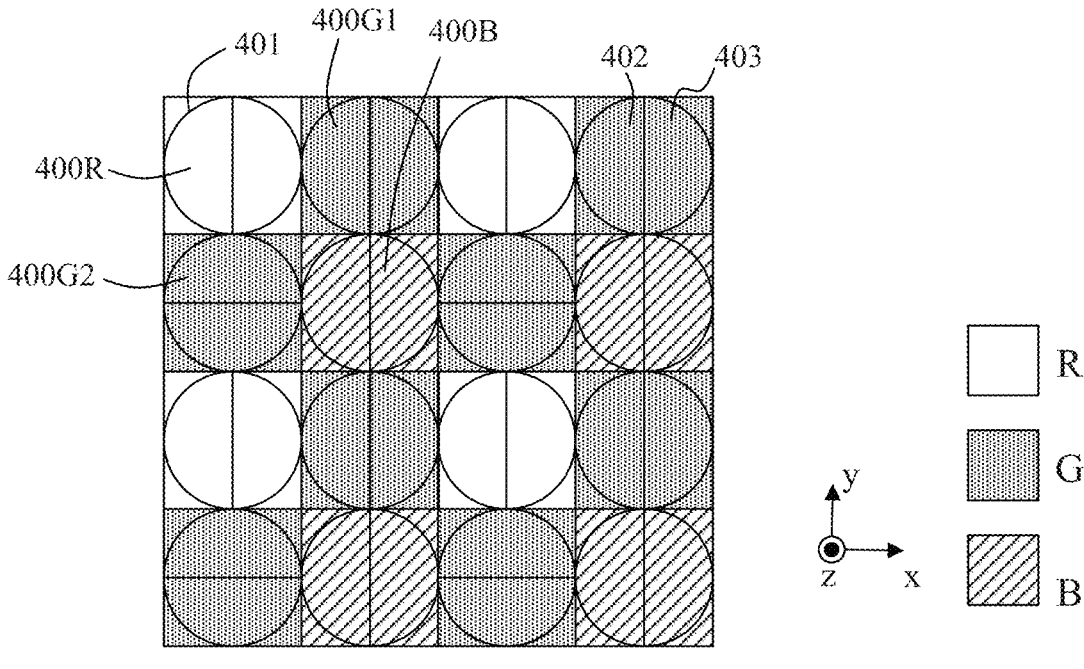
FIG. 4 illustrates the pixel array on an image sensor according to Example 1.
FIGS. 5A and 5B illustrate a pupil distance between the lens and the image sensor in Example 1.

FIG. 4 illustrates a pixel array on the image sensor 211 in this embodiment. FIG. 4 illustrates a pixel array of a two-dimensional CMOS sensor as the image sensor 211 in a range of 4 columns times 4 rows of imaging pixels.

One pixel group consists of 2 columns times 2 rows of imaging pixels, and each imaging pixel is provided with Bayer-array color filters. In one pixel group, an imaging pixel (red pixel) 400R having red spectral sensitivity is located at the upper left, and imaging pixels (green pixels) 400G1 and 400G2 having green spectral sensitivity are located at the upper right and lower left. An imaging pixel (blue pixel) 400B having blue spectral sensitivity is located at the lower right. Furthermore, in order to perform imaging-surface phase-difference AF, each imaging pixel (focus detecting pixel) has a single microlens 401 and a plurality of (two in 2 columns times 1 row or 1 column times 2 rows) photodiodes (first and second photoelectric converters) 402 and 403 as photoelectric converter. By arranging a large number of pixel groups illustrated in FIG. 4 on the image sensor, the image sensor can acquire an image signal and a focus detecting signal from the entire imaging surface.

In each imaging pixel (focus detecting pixel), an incident light beam is separated into two by a microlens 401, and each light beam is received by photodiodes 402 and 403. A signal read out of the photodiode 402 will be called an A signal, and a signal read out of the photodiode 403 will be called a B signal. By combining the A signal and B signal read out of the photodiodes 402 and 403 of a plurality of focus detecting pixels (green, red, and blue pixels) within the focus detecting area selected on the imaging surface, An image signal and B image signal are obtained as focus detecting signals. An imaging signal is generated by combining the A+B signal obtained by adding the A signal and the B signal read out of the photodiodes 402 and 403 of each imaging pixel over all the imaging pixels.

In the red pixel 400R, the green pixel 400G1, and the blue pixel 400B, the photodiodes 402 and 403 are divided in the horizontal direction (lateral direction), and a phase difference (image shift amount) in the horizontal direction can be detected. A focus detecting pixel that can detect the image shift amount in the horizontal direction (first direction) will be called a horizontal pixel as a first pixel, and the photodiodes 402 and 403 provided in the horizontal pixel correspond to first photoelectric converters. On the other hand, in the green pixel 400G2, the photodiodes 402 and 403 are vertically divided, and an image shift amount in the vertical direction (longitudinal direction) can be detected. A focus detecting pixel that can detect an image shift amount in the vertical direction (second direction) will be called a vertical pixel as a second pixel. The photodiodes 402 and 403 provided in the vertical pixels correspond to second photoelectric converters. The horizontal pixels and vertical pixels can realize highly accurate focus detection regardless of the edges of the object.

The A signal and the B signal may be read out of the photodiodes 402 and 403 and used, but for example, the A signal and the B signal may be obtained by reading out the A+B signal and the A signal and calculating a difference between them. An array of horizontal and vertical pixels may be other than the example illustrated in FIG. 4, and only a part of all the imaging pixels may be horizontal and vertical pixels as focus detecting pixels.

In this embodiment, horizontal and vertical pixels are separately provided, but a single focus detecting pixel is provided with a total of four photodiodes divided into two in each of the horizontal and vertical directions. That is, the horizontal pixel and the vertical pixel may be the same focus detecting pixel.

Relationship Between Image Shift Amount and Defocus Amount

Figure 9:
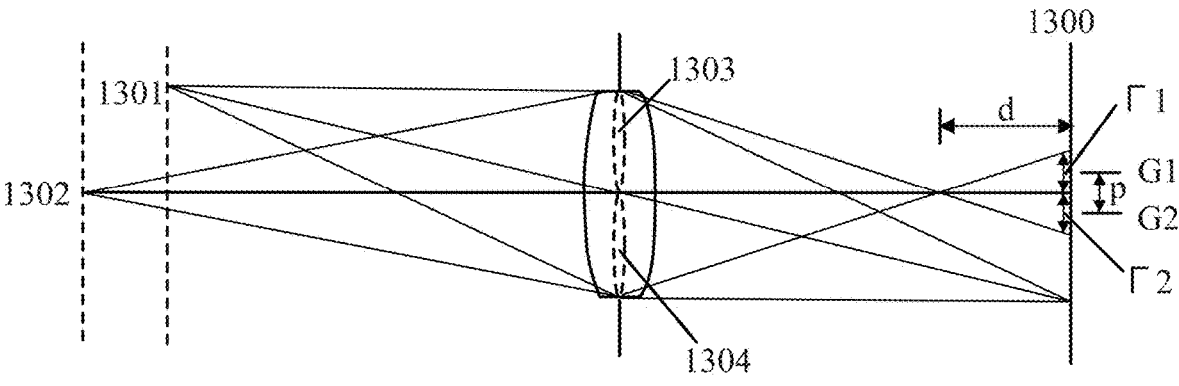
FIG. 9 illustrates a relationship between image shift amount and defocus amount according to Example 1.

Referring now to FIG. 9, a description will be given of a relationship between an image shift amount p and a defocus amount d calculated from the pair of focus detecting signals (A image signal and B image signal). A description will now be given of a general single-lens type imaging optical system having a single optical system and having an optical axis located at the center of the image sensor. Reference numeral 1300 denotes an imaging surface of the image sensor.

The exit pupil of the imaging optical system is divided into two, i.e., a first pupil area 1303 and a second pupil area 1304 by the microlens provided in the focus detecting pixel. The pupil dividing direction at this time corresponds to the dividing direction of the photodiodes 402 and 403 of the focus detecting pixel illustrated in FIG. 4. For example, in a case where the dividing direction of the photodiodes 402 and 403 in the horizontal pixel is the vertical direction in FIG. 9, the dividing direction of the photodiodes 402 and 403 in the vertical pixel is perpendicular to the paper plane of FIG. 9.

Regarding a defocus amount d, a distance from the imaging position of the optical image by the imaging optical system to the imaging surface 1300 is expressed as its size |d|, and a front focus state in which the imaging position of the object image is located on the object side of the imaging surface 1300 is represented by a negative sign (d<0). A rear focus state in which the imaging position is located on the opposite side to the object side of the imaging surface 1300 is represented by a positive sign (d>0). An in-focus state where the imaging position of the object image is located on the imaging surface 1300 is represented as d=0. FIG. 9 illustrates the case where the imaging optical system is in the front focus state (d<0) with respect to the object plane 1302 and the case where the imaging optical system is in the in-focus state on the object plane 1301. The front focus state (d<0) and the rear focus state (d>0) will be collectively referred to as a defocus state (|d|>0).

In the front focus state (d<0), among the light beams from the object plane 1302, the light beams that have passed through the first pupil area 1303 and the second pupil area 1304 are once condensed, then spread to widths Γ1 and Γ2 around the center of gravity positions G1 and G2 of the light beams as centers, and form a blurred object image on the imaging surface 1300. In a case where the blurred object image is received by the photodiodes 402 and 403 of each focus detecting pixel, a pair of focus detecting signals having an image shift amount p as a phase difference is generated. The blur widths Γ1 and Γ2 increase approximately in proportion to the increase in the magnitude |d| of the defocus amount. Similarly, the magnitude |p| of the image shift amount p (=difference G1–G2 in the center of gravity position of the light beam) also increases approximately in proportion to the increase in the magnitude |d| of the defocus amount d. This is similarly applied to the rear focus state (d>0), although the image shift direction between the pair of focus detecting signals is opposite to that in the front focus state.

A conversion coefficient K is used to convert the calculated image shift amount p to the defocus amount d. The conversion coefficient K depends on the incident angle of the light beam from the imaging optical system to the image sensor, the F-number of the imaging optical system, and the optical axis position, and is obtained (calculated) based on lens optical-information, which will be described later, including these pieces of information.

Focus Detecting Processing

Figure 10:
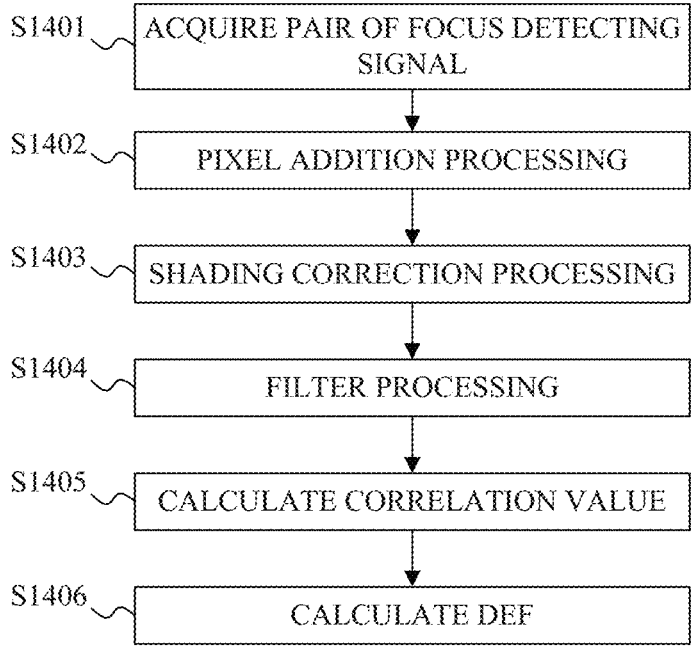
FIG. 10 is a flowchart illustrating focus detecting processing according to Example 1.

The flowchart in FIG. 10 illustrates focus detecting processing in the AF processing according to this embodiment. The camera control unit 218 as a computer executes this processing according to the program. The camera control unit 218 corresponds to a focus detector.

In step S1401, the camera control unit 218 as a focusing apparatus reads out the A signal and B signal from two photodiodes in each of a plurality of focus detecting pixels within a focus detecting area selected by the user or automatically selected by the camera control unit 218 according to a predetermined algorithm. The A and B signals read out of the plurality of focus detecting pixels are then combined to generate the A image signal and B image signal, which are a pair of focus detecting signals.

Next, in step S1402, the camera control unit 218 performs pixel addition processing for each of the A image signal and the B image signal. More specifically, the addition processing is performed in the column direction to suppress a signal data amount, and further processing of addition of signals from red, green, and blue pixels is performed to generate the Y signal. In a case where the number of pixels added in this pixel addition processing is two, the pixel pitch is doubled, so the Nyquist frequency is ½ of that of non-addition, and in a case where the number of pixels added in this pixel addition processing is three, the pixel pitch is tripled. The Nyquist frequency becomes ⅓ of that of non-addition.

Next, in step S1403, the camera control unit 218 performs shading correction processing (optical correction processing) for the A image signal and B image signal that have undergone the pixel addition processing to match their intensities. A shading correcting value at this time depends on the imaging optical system, more specifically, a value that depends on an incident angle of the light beam from the imaging optical system to the image sensor, the F-number of the imaging optical system, and the optical axis position. The camera control unit 218 calculates a shading correcting value based on lens optical-information, which will be described later, received from the lens control unit 205. At this time, the camera control unit 218 also calculates a conversion coefficient based on the lens optical-information.

Next, in step S1404, the camera control unit 218 performs band-pass filter processing for the A-image signal and the B-image signal to pass a specific frequency band. This processing improves the correlation (degree of signal coincidence) between the A image signal and the B image signal to improve focus detecting accuracy. A Bandpass filter includes a differential filter (1, 4, 4, 4, 0, −4, −4, −4, −1) that cut DC components and extract edges, and an additive filter (1, 2, 1), etc. that suppress high-frequency noise components.

Next, in step S1405, the camera control unit 218 performs shift processing to relatively shift the A image signal and B image signal after the bandpass filter processing in the pupil dividing direction, and calculates a correlation amount representing a degree of coincidence.

The correlation amount COR is calculated by the following equation (1):

$$COR(s) = \sum_{k \in W} |A(k) - B(k-s)|, \, s \in \Gamma \qquad (1)$$

where A(k) is a k-th A image signal that has undergone the bandpass filter processing, B(k) is a k-th B image signal that has undergone the bandpass filter processing, W is a range of number k corresponding to the focus detecting area, and s is a shift amount due to shift processing, and Γ is a shift range of the amount s.

Through this shift processing of the shift amount s, the camera control unit 218 associates the k-th A image signal A(k) and the k-th B image signal B(ks) with each other, subtracts them, and generates a shift subtraction signal. Then, the camera control unit 218 calculates the absolute value of the generated shift subtraction signal and the sum of the numbers k within the range W corresponding to the focus detecting area to calculate the correlation amount COR(s). At this time, the correlation amount calculated for each row may be added across multiple rows for each shift amount.

Next, in step S1406, the camera control unit 218 calculates a real-number shift amount that minimizes the correlation amount using subpixel calculation and the calculated correlation amount, and sets the calculated shift amount as an image shift amount p. Then, the camera control unit 218 calculates defocus amount (Def) d by multiplying the image shift amount p by the conversion coefficient K. The camera control unit 218 includes a selector configured to select a direction to be used for focus control of the imaging optical system among the first direction and the second direction. The camera control unit 218 further includes a determining unit configured to determine a defocus amount that is used for focus control of the imaging optical system using one of the first and second pair of signals according to the type of the imaging optical system.

In calculating the defocus amount in this way, a signal correcting value (shading correcting value) and a conversion coefficient are used as focus detection adjusting values according to the imaging optical system. These focus detection adjustment values depend on the incident angle and light shielding state of the light beam incident on the image sensor. In a twin-lens type imaging optical system as in this example, the two optical axes are located left and right shifted from the center of the image sensor. Thus, even if the same signal correction amount and conversion coefficient as those for a single-lens type imaging optical system in which the optical axis is located at the center of the image sensor are used, accurate defocus amount cannot be obtained. In other words, for a twin-lens type imaging optical system, a proper focus detection adjustment value corresponding to the optical axis shifted from the center of the image sensor is to be used.

The signal correcting value in the focus detection adjustment value is not limited to the shading correcting value, and may be any signal correcting value for improving focus detecting accuracy.

Signal Correcting Value

Figure 11:
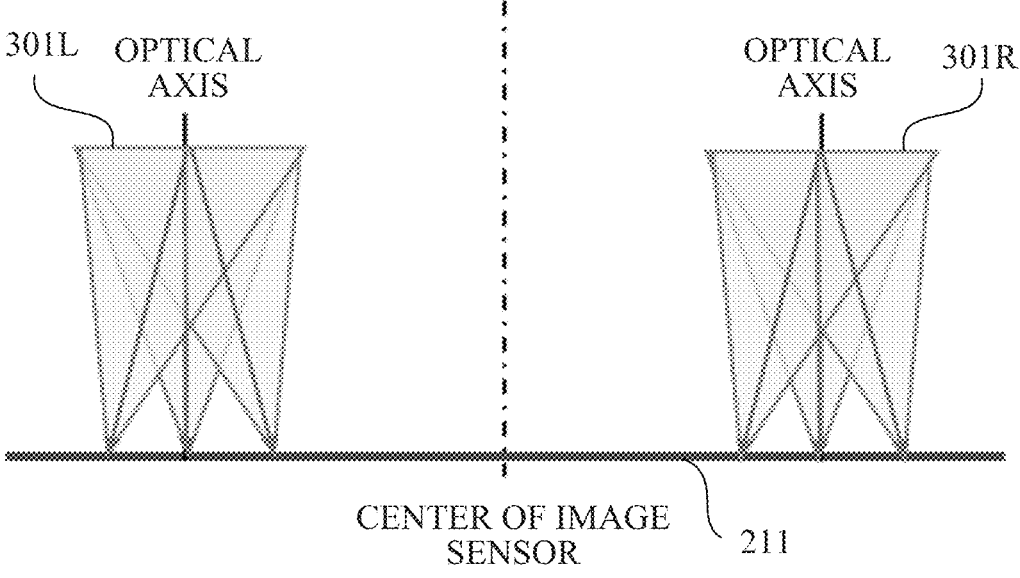
FIG. 11 illustrates a relationship between the image sensor and the optical axes of two optical systems in Example 1.

FIG. 11 illustrates two optical systems (301L, 301R) having optical axes at positions shifted left and right from the center of the image sensor 211. The diameter of the image circle around each optical axis as a center is approximately ½ of the long side of the image sensor.

Figures 12A, 12B:
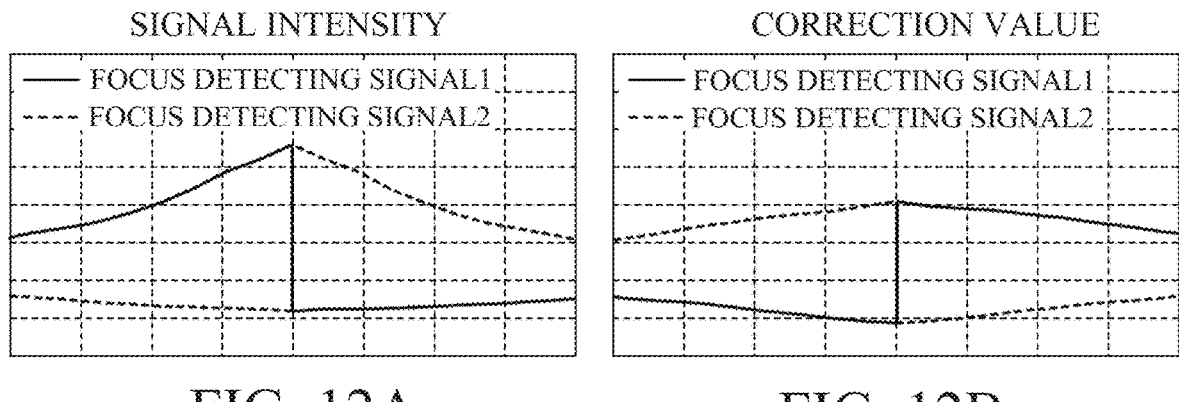
FIGS. 12A and 12B illustrate examples of signal intensities and a signal correcting value for a focus detecting pixel in a case where two optical systems are used.

FIG. 12A illustrates an example of light amount changes within the image sensor of focus detecting signal 1 as the A image signal and focus detecting signal 2 as the B image signal. In FIG. 12A, a horizontal axis represents an X image height, and a vertical axis represents a light amount. Since the optical axes of the two optical systems are shifted to the left and right from the center of the image sensor, the light amount changes discontinuously at the center of the image sensor. This is different from the case of using a single-lens type imaging optical system that illustrates a continuous light amount change within the image sensor, and a characteristic of the twin-lens type of imaging optical system.

FIG. 12B illustrates an example of a signal correcting value for matching the intensities of focus detecting signals 1 and 2. In FIG. 12B, a horizontal axis represents an X image height, and a vertical axis represents a correction value that is used so that the intensities of the focus detecting signals 1 and 2 correspond to each other. In order to handle discontinuous light amount changes within the image sensor, the signal correcting value also illustrates discontinuous changes at the boundary between the two image circles. A signal correcting value for a single-lens type imaging optical system and a signal correcting value for a twin-lens type imaging optical system are separately stored in a memory (nonvolatile memory 220, etc.) within the camera 100. The camera control unit 218 switches the signal correcting value to be used depending on whether the imaging optical system of the lens unit attached to the camera 100 is a single-lens type or a twin-lens type. Whether the imaging optical system is a single-lens type or a twin-lens type may be notified by the lens unit to the camera control unit 218 through communication, or the camera control unit 218 may determine it from the individual information (lens ID) of the lens unit.

The signal correcting value is calculated using lens optical-information that indicates the incident angle and light shielding state of the light beam that enters the image sensor from the imaging optical system. At this time, the positions of the two optical axes on the image sensor are important in order to calculate a signal correcting value for a twin-lens type imaging optical system in which the center of the image sensor and the position of each optical axis are offset. This example acquires lens optical-axis information (Lx, Ly) regarding the position of the optical axis of the optical system on the coordinates of the image sensor, and converts the lens optical-information expressed by using the optical axis position of each optical system as the origin into coordinates on the image sensor. The lens optical-axis information regarding the optical axis position may be information that directly indicates the optical axis position (Lx, Ly), or may be information that can be converted into the optical axis position.

For example, as illustrated in Table 1, assume lens optical-information indicating that incident angle at position r that is separated from the optical axis by 10 mm is 5 degrees, and the coordinates of the optical axes of the twin-lens type optical system on the image sensor indicating Lx=5 mm and Ly=0 mm. Then, it is understood from the lens optical-information that an incident angle at x=15 mm, y=0 mm and x=−5 mm, y=0 mm, which are separated from the optical axis by 10 mm, is 5 degrees.

Thus, by acquiring the lens optical-axis information (Lx, Ly), the camera control unit 218 can convert the lens optical-information expressed by using the optical axis as the origin into coordinates on the image sensor. Then, the camera control unit 218 calculates a signal correcting value using the lens optical-information converted into the coordinates on the image sensor.

TABLE 1

| OPTICAL INFORMATION | | |
|---|---|---|
| INCIDENT ANGLE | r [mm] | ANGLE [degrees] |
| | 10 | 5 |
| OPTICAL AXIS | Lx [mm] | Ly [mm] |
| POSITION | 5 | 0 |

Conversion Coefficient

FIGS. 5A and 5B illustrate a lens aperture at pupil distance LPO of the optical system (lens) (referred to as LPO aperture hereinafter) and a lens aperture at pupil distance SPO of the image sensor (referred to as SPO aperture hereinafter). The image sensor having the pixel array illustrated in FIG. 4 is placed at x=0 and z=0 in FIGS. 5A and 5B. The pupil distance LPO of the lens is determined from an exit pupil distance, which is a distance on the optical axis from the imaging surface of the image sensor to an exit pupil located at an image position of the aperture stop. The pupil distance SPO of the image sensor is a distance determined from the size of the imaging surface and a shrink rate of the microlens (401 in FIG. 4) disposed on the imaging surface. The shrink rate is an amount by which the microlens is decentered toward the optical axis side from the center of the image sensor at a peripheral image height in a case where the size of the microlens is smaller than the size of the image sensor. LPO and SPO may be equal to each other, but in an actual optical system, it is common that LPO and SPO are designed to be substantially equal to each other within a range that maintains focus detecting accuracy, and that they do not often match perfectly. FIGS. 5A and 5B illustrate a case where LPO is shorter than SPO.

The LPO aperture diameter DL is proportional to the F-number of the optical system. The SPO aperture diameter DL' differs from DL by the ratio of LPO and SPO as follows:

$$DL'=DL \times SPO/LPO$$

This illustrates how the SPO aperture is formed in a case where focus detection is performed at the center image height (x=0), as illustrated in FIG. 5A.

On the other hand, FIG. 5B illustrates a case where x=10 mm, that is, a case where focus detection is performed at a peripheral image height. Due to the image height change from the central image height, the SPO aperture diameter DL' is no longer symmetrical in the x direction with respect to the z-axis. Generally, in a case where the image height is high on the x-axis, the aperture diameter DL' will not be symmetrical about the x-axis, and in a case where the image height is high on the y-axis orthogonal to the x-axis and the z-axis, the SPO aperture diameter DL' will be no longer symmetrical to the y-axis. In a case where the image height changes in this way, the way the SPO aperture is formed changes. Furthermore, the shape of the SPO aperture (SPO aperture shape), especially in the minimum F-number state, significantly changes depending on the arrangement of the plurality of lenses in the optical system, and is no longer circular.

Figures 6A, 6B, 6C:
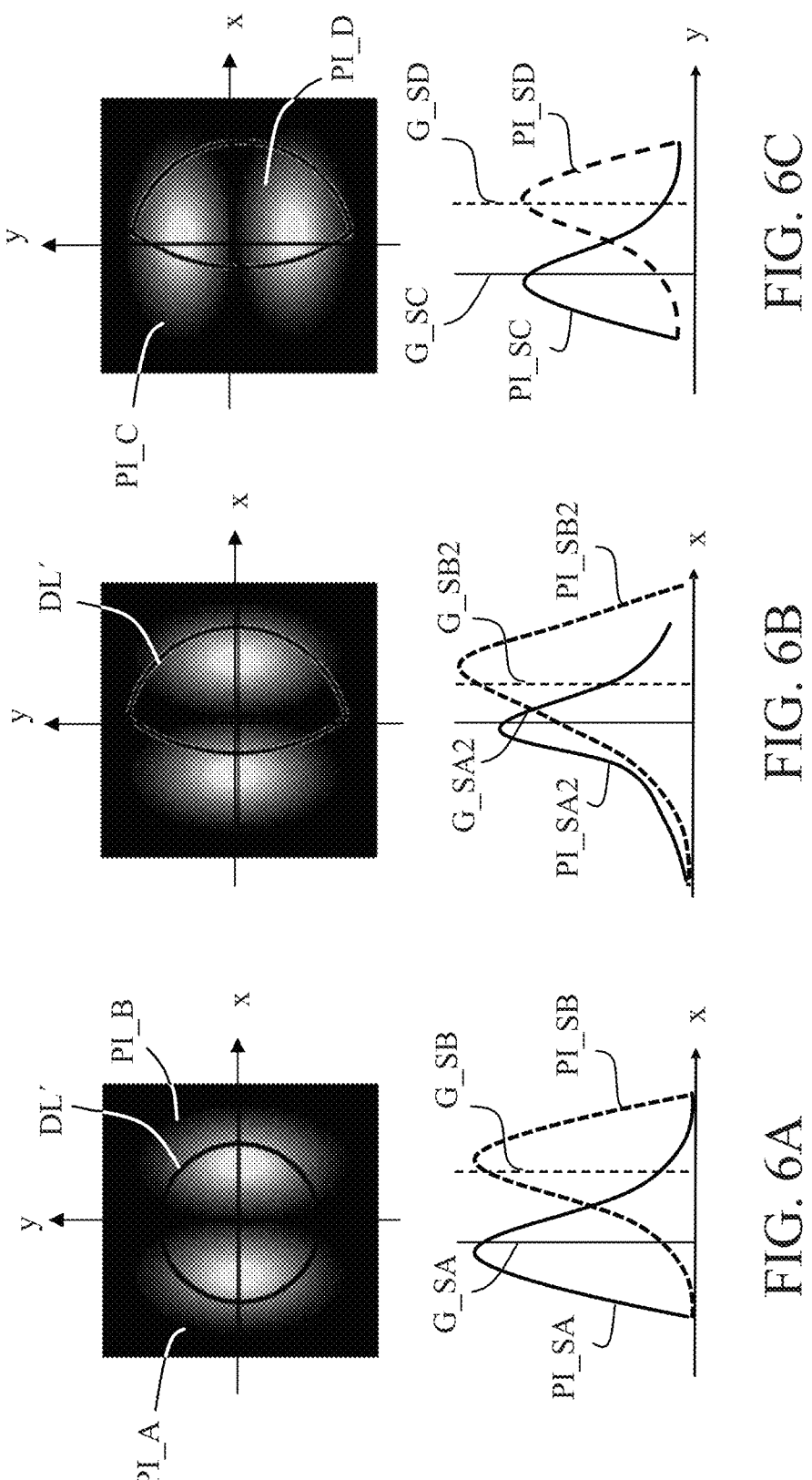
FIGS. 6A, 6B, and 6C illustrate a lens aperture and the intensity of two optical images in Example 1.

The top diagrams in FIGS. 6A, 6B, and 6C illustrate the incident angle characteristics PI_N (N=A to D) of the sensor superimposed on the SPO aperture (xy plane). In FIGS. 6A, 6B, and 6C, the bottom diagrams illustrate a section along the pupil dividing direction of the top diagram. The incident angle characteristic PI_N indicates the incident angle characteristic of the two photodiodes 402 and 403 divided as illustrated in FIG. 4, and at each coordinate, a higher light intensity is illustrated by a whiter portion, and a lower light intensity is illustrated by a darker portion.

FIGS. 6A and 6B illustrate the incident angle characteristics PI_A and PI_B of horizontal pixels. The SPO aperture diameter DL' illustrated in the top diagram of FIG. 6A corresponds to DL' at the center image height illustrated in FIG. 5A. Generally, at the center image height, the SPO aperture shape determined by the aperture shape is circular, and optical images PI_SA and PI_SB have a line-symmetrical shape with respect to the z-axis (perpendicular to the x-axis and passing through an intersection of the optical images PI_SA and PI_SB). PI_A and PI_B within the SPO aperture diameter DL' indicate the intensities of the optical images actually received by the image sensor, and the bottom diagram in FIG. 6A illustrates the optical images PI_SA and PI_SB in the pupil dividing direction (x direction) where the vertical axis represents the intensity. A center-of-gravity difference G_SB−G_SA can be calculated by calculating the center of gravity G_SA of the optical image PI_SA and the center of gravity G_SB of the optical image PI_SB. In general, the conversion coefficient K is calculated as follows:

$$K=SPO/(G\_SA-G\_SB)$$

As explained in FIG. 10, the defocus amount in the light direction is an amount determined by image shift amount p times K, and a large conversion coefficient K corresponds to a small center-of-gravity difference G_SB−G_SA. In general, the larger the center-of-gravity difference (absolute value of the correlation amount) is, the higher the detection accuracy in bit accuracy during defocus is, so it is easier to increase the focus detecting accuracy.

The SPO aperture diameter DL' illustrated in the top diagram in FIG. 6B corresponds to DL' at a high image height illustrated in FIG. 5B. Since the SPO aperture shape is not symmetrical in the x direction as the pupil dividing direction and limits a light amount in that direction, it is difficult to distinguish an intensity difference between optical images PI_SA2 and PI_SB2 in the pupil division direction, as illustrated in the bottom diagram of FIG. 6B, and the center-of-gravity difference between them G_SA2–G_SB2 also becomes narrower. In such a case, the conversion coefficient K becomes large and focus detecting accuracy lowers.

The top diagram in FIG. 6C illustrates the incident angle characteristics PI_C and PI_D of the vertical pixel superimposed on the SPO aperture (xy plane). Although a light amount is limited in the xy plane by the SPO aperture shape, an image shift amount detected in the vertical pixel is an image shift amount in the y direction. PI_C and PI_D within the SPO aperture diameter DL' indicate the intensities of the optical images actually received by the image sensor, and the bottom diagram in FIG. 6C illustrates the optical images PI_SC and PI_SD in the pupil dividing direction (y direction) where the vertical axis represents the intensity. A center-of-gravity difference G_SC–G_SD between the center of gravity G_SC of the optical image PI_SC and the center of gravity G_SD of the optical image PI_SD is wider than the center-of-gravity difference G_SA2–G_SB2 in the horizontal pixel illustrated in FIG. 6B, and it is easier to maintain focus detecting accuracy.

Thus, focus detecting accuracy changes depending on the lens aperture shape (SPO aperture shape) and the incident angle characteristic of the image sensor. Generally, in a case where focus detection is performed at a high image height in the x direction, a vertical pixel tends to be beneficial to focus detecting accuracy. Conversely, in a case where focus detection is performed at a high image height in the y direction, the lens aperture shape is rotated by 90 degrees from the shape illustrated in FIG. 6B, so a horizontal pixel tends to be beneficial to focus detecting accuracy. The lens optical-information including the lens aperture shape, F-number, and exit pupil distance (LPO) is transmitted from the lens unit 200 to the camera 100. The camera control unit 218 calculates the conversion coefficient K based on lens optical-information.

AF Processing

Figure 7:
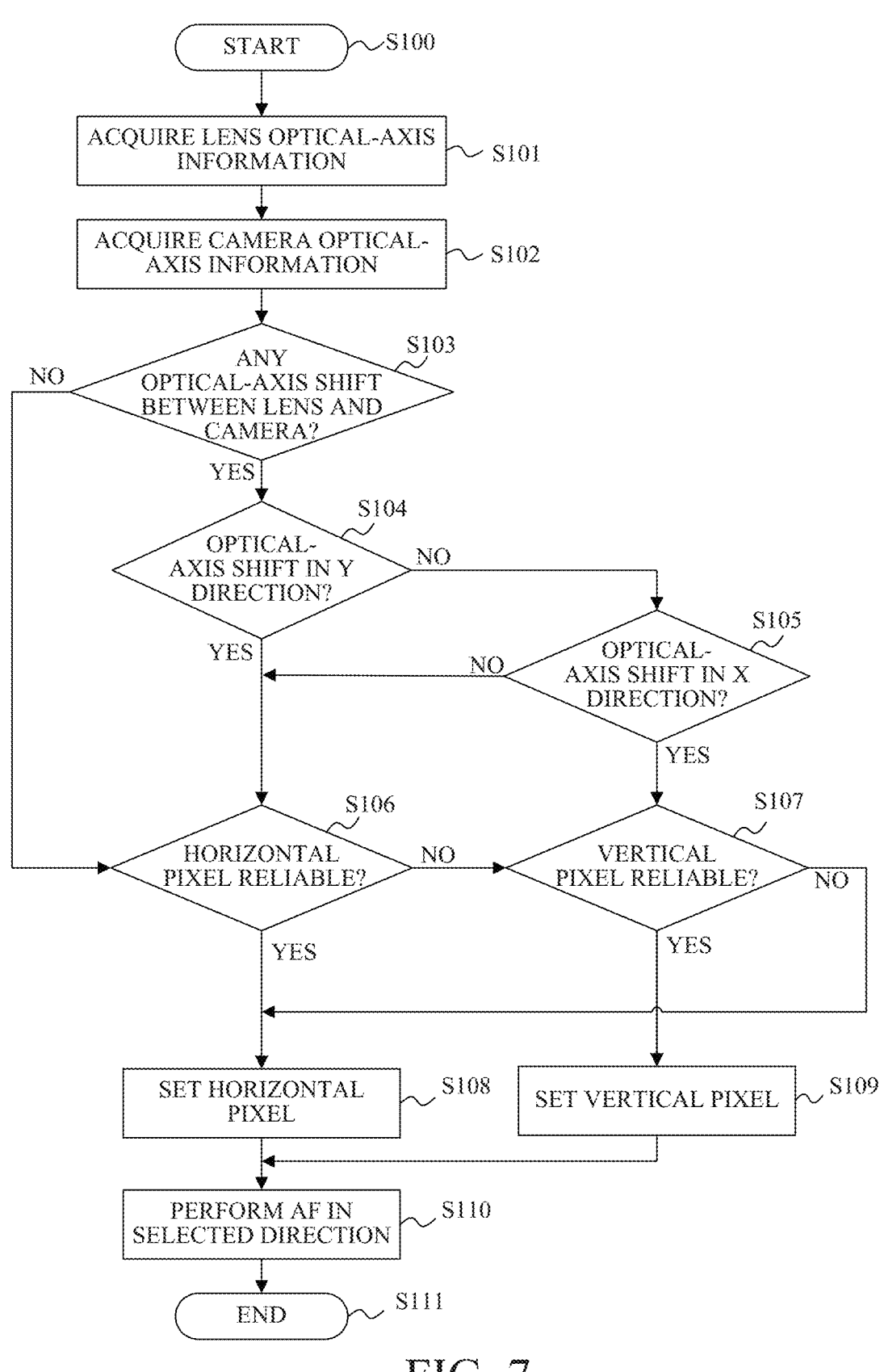
FIG. 7 is a flowchart illustrating AF processing according to Example 1.

A flowchart illustrated in FIG. 7 illustrates the AF processing (focus detecting method) executed by the camera control unit 218 according to a program in this embodiment.

Upon receiving the first shutter switch signal SW1, the camera control unit 218 starts processing from step S100.

In step S101, the camera control unit 218 acquires lens optical-axis information from the lens unit 200. Here, the lens optical-axis information indicating positions R_C and L_C of the optical axes of the two optical systems (301L, 301R) on the image sensor (imaging surface) is acquired. As illustrated in FIG. 8, in a case where two optical images 801L and 801R are formed side by side in the x direction on the imaging surface 800 by the two optical systems, the positions of the optical axes of the two optical systems (x, y) are expressed as follows:

$$L\_C = (-9, 0)$$

$$R\_C = (+9, 0)$$

The camera control unit 218 acquires lens optical-axis information through communication with the lens control unit 205. The lens optical-axis information may be stored in advance in the memory in the camera 100 in association with the lens ID, and may be acquired by reading the lens optical-axis information corresponding to the lens ID received from the lens control unit 205 in a case where the lens unit 200 is attached to the camera 100.

Next, in step S102, the camera control unit 218 acquires camera optical-axis information regarding the position of the optical axis (center of the image sensor) in the camera 100. The center position of the image sensor may shift from the designed center position due to manufacturing errors of the camera 100. In addition, in a case where the camera 100 is configured to correct image blur caused by camera shake such as manual shake by shifting the image sensor from the neutral position in a direction orthogonal to the optical axis (that is, in a case where the camera 100 has an image stabilizing function), the center position of the image sensor shifts from the center position at the neutral position according to a shift amount of the image sensor from the neutral position. The camera optical-axis information may be information that directly indicates the center position of the image sensor using coordinates, or may be information that can be converted into the center position of the imaging surface. In a case where the image stabilization function is used during moving image capturing, the camera optical-axis information may be acquired for each imaging frame.

Next, in step S103, the camera control unit 218 compares the positions of the optical axes of the two optical systems indicated by the lens optical-axis information acquired in step S101 and the position of the optical axis of the camera 100 acquired in step S102, and determines whether there is a difference (optical axis shift) between them. Here, since the optical axes of the two optical systems are shifted to the left and right from the center of the image sensor, the camera control unit 218 determines that there is an optical axis shift and the flow proceeds to step S104. In a case where the single-lens type lens unit is attached to the camera 100 and the optical axis of the camera 100 is located at the designed center, the flow proceeds to step S106.

In step S104, the camera control unit 218 determines whether the optical-axis shift direction is the y direction. For example, in a case where the positions of the optical axes of the two optical systems are L_C=(−9,0) and R_C=(+9,0) as illustrated in FIG. 8 and the optical axis of the camera 100 is at the designed center, there is no optical axis shift in the y direction, so the flow proceeds to step S105. In a case where the optical-axis shift direction is the y direction, the flow proceeds to step S106.

In step S105, the camera control unit 218 determines whether the optical-axis shift direction is the x direction. In a case where the positions of the optical axes of the two optical systems are L_C=(−9,0) and R_C=(+9,0) as illustrated in FIG. 8 and there is an optical axis shift in the x direction, the flow proceeds to step S107. In a case where the optical-axis shift direction is not the x direction, the flow proceeds to step S106.

In step S106, the camera control unit 218 determines whether an image shift amount obtained from the horizontal pixel is reliable (referred to as a horizontal pixel is reliable hereinafter). As described above, the horizontal pixel is beneficial to focus detecting accuracy at a high image height in the y direction. However, in a case where the contrast of an object is low in the y direction, etc., a pair of focus detecting signals with a high degree of coincidence cannot be obtained from the horizontal pixel, and as a result, a highly reliable image shift amount cannot be obtained. The reliability can also be predicted from the lens optical-information. For example, in a case where the lens aperture shape is smaller in the x direction for a horizontal pixel as illustrated in FIG. 6B, the reliability is highly likely to deteriorate. In a case where the F-number is large, the conversion coefficient is large and the reliability may deteriorate. In a case where the difference between LPO and SPO is large, the reliability is highly likely to deteriorate. In a case where the horizontal pixel is reliable (the reliability is higher than a predetermined value), the flow proceeds to step S108, and if not, the flow proceeds to step S107.

On the other hand, in step S107, the camera control unit 218 determines whether the image shift amount obtained from the vertical pixels is reliable (simply referred to as the vertical pixel is reliable hereinafter). As described above, the vertical pixel is beneficial to focus detecting accuracy at a high image height in the x direction. However, in a case where the contrast of an object is low in the x direction, etc., a pair of focus detecting signals with a high degree of coincidence cannot be obtained from the vertical pixel, and as a result, a highly reliable image shift amount cannot be obtained. As explained in step S106, the reliability can also be predicted from the lens optical-information. The flow proceeds to step S109 in a case where the vertical pixel is reliable (the reliability is higher than a predetermined value), and otherwise the flow proceeds to step S108.

In step S109, the camera control unit 218 sets (selects) the vertical pixel as a focus detecting pixel for focus detection. That is, the second photoelectric converters are set as the photoelectric converters for the focus detection. Then, the flow proceeds to step S110.

On the other hand, in step S108, the camera control unit 218 sets a horizontal pixel as a focus detecting pixel for focus detection. That is, the first photoelectric converters are set as the photoelectric converters for focus detection. Then, the flow proceeds to step S110.

Thus, the camera control unit 218 as a determining unit determines a defocus amount for focus control of the imaging optical system by preferentially using one of the first and second pair of signals and the type of the imaging optical system.

In a case where it is determined in step S106 that the horizontal pixel is not reliable and it is determined in step S107 that the vertical pixel is not reliable, the horizontal pixel is set as a focus detecting pixel for focus detection in step S108. As illustrated in FIG. 4, in one pixel group, the vertical pixel includes one green pixel 400G2, while the horizontal pixel includes three, i.e., red, green, and blue pixels 400R, 400G1, and 400B. In light of the SN ratio of the signal from the image sensor, even if it is determined that the reliability of either the horizontal pixel or vertical pixel is low, using signals from horizontal pixels, which have a larger number, is likely to provide better focus detecting accuracy. Therefore, even when the flow proceeds from step S107 to step S108, the horizontal pixel is set as the focus detecting pixel for focus detection.

However, in a case where it is determined in step S107 that the vertical pixel is not reliable, no focus detection may be selected.

In step S110, the camera control unit 218 performs focus detection using the signal from the focus detecting pixel selected in step S108 or S109. More specifically, the camera control unit 218 performs the focus detecting processing described in the flowchart of FIG. 10, and transmits a focus drive command including an obtained defocus amount to the lens control unit 205. Upon receiving the focus drive command, the lens control unit 205 performs focus drive of the left-eye optical system 301L and the right-eye optical system 301R according to the defocus amount. Thereby, an in-focus state on the object can be obtained. The flow then ends in step S111.

As described above, in using a twin-lens type lens unit, this embodiment sets a proper signal correcting value and conversion coefficient according to the shift directions of the optical axes of the two optical systems from the center of the image sensor. Thereby, highly accurate focus detecting results and AF results can be obtained for a twin-lens type lens unit.

In the twin-lens type lens unit, the positions of the optical axes of the two optical systems corresponding to FIG. 6A are (x, y)=(±9, 0). In each of the two optical systems, in the horizontal pixel, changes in the x direction at the image height of y=0 cause changes in the lens aperture shape and center of gravity difference as illustrated in FIG. 6B. Therefore, in focus detection at the image height of y=0, there is little change in the center of gravity difference in the vertical pixel caused by the image shift changes, and a stable signal can be obtained, so the reliability of the vertical pixel is likely to be higher.

Example 2

Example 1 uses a twin-lens type imaging optical system, but even when at least part of the optical axis of the imaging optical system is decentered from the center of the image sensor, such as a tilt/shift (TS) lens, this example can perform highly accurate focus detection as in Example 1.

Figure 13A:
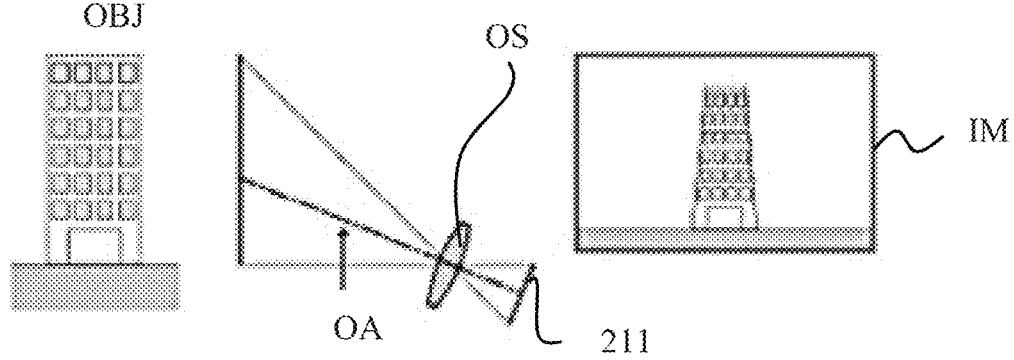
FIGS. 13A and 13B explain Example 2 using a shift optical system.
Figure 13B:
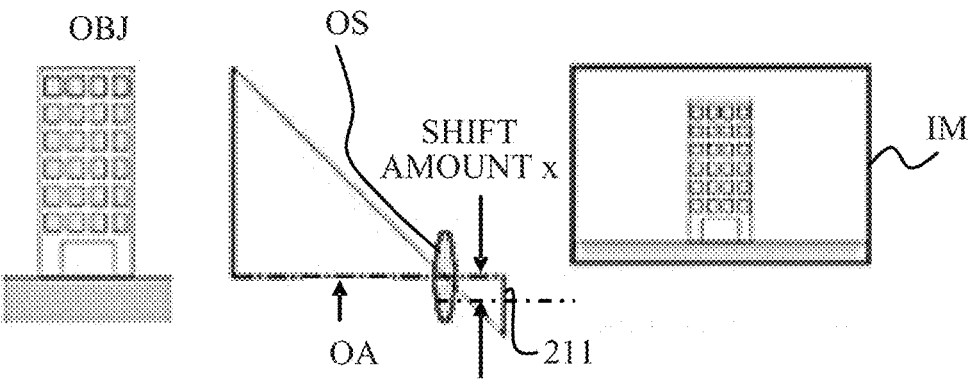

Referring now to FIGS. 13A and 13B, a description will be given of the function of the TS lens. FIG. 13A illustrates a relationship among object OBJ, optical axis OA of the imaging optical system, and the image sensor 211 in a state where the TS lens is not shifted.

In the state of FIG. 13A, the optical axis OA of the imaging optical system and the center of the image sensor 211 coincide. In a case where the optical axis OA is oblique relative to a rectangular building as the object OBJ in this state, a trapezoidal object image is formed as illustrated in the optical image IM.

On the other hand, FIG. 13B illustrates a relationship among the object OBJ, the optical axis OA of the imaging optical system, and the image sensor 211 in a case where the TS lens is shifted. In the state of FIG. 13B, the optical axis OA of the imaging optical system is decentered from the center of the image sensor 211. In this state, in a case where the optical axis OA is orthogonal to a rectangular building as the object OBJ, a rectangular object image is formed as illustrated in the optical image IM. That is, the perspective of the object image is adjusted and distortion is corrected.

In this example, in step S101 of FIG. 7, the camera control unit 218 acquires the eccentricity (decentering) amount (tilt or shift amount) x of the optical axis of the TS lens as lens optical-axis information. Then, in steps S103 to S109, the camera control unit 218 sets either the horizontal pixel or the vertical pixel as a focus detecting pixel, depending on an optical-axis shift direction from the center of the image sensor indicated by the lens optical-axis information.

Thereby, in using a TS lens as a lens unit, a proper signal correcting value and conversion coefficient are obtained according to the optical-axis shift direction of the imaging optical system from the center of the image sensor, and a highly accurate focus detecting result and AF result can be obtained for the TS lens.

Other Embodiments

Embodiment(s) of the disclosure can also be realized by a computer of a system or apparatus that reads out and executes computer-executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer-executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer-executable instructions. The computer-executable instructions may be provided to the computer, for example, from a network or the storage medium. The storage medium may include, for example, one or more of a hard disk, a random-access memory (RAM), a read-only memory (ROM), a storage of distributed computing systems, an optical disc (such as a compact disc (CD), digital versatile disc (DVD), or Blu-ray Disc (BD)™), a flash memory device, a memory card, and the like.

While the disclosure has described example embodiments, it is to be understood that some embodiments are not limited to the disclosed embodiments. The scope of the following claims is to be accorded the broadest interpretation so as to encompass all such modifications and equivalent structures and functions.

As described above, an image pickup apparatus according to one aspect of the disclosure includes an image sensor configured to capture an object image formed by an imaging optical system, and to acquire a first pair of signals generated by light beams that have passed areas in an exit pupil that are different from each other and arranged in a first direction and a second pair of signals generated by light beams that have passed areas in the exit pupil that are different each other and arranged in a second direction different from the first direction, and a selector configured to select a direction to be used for focus control of the imaging optical system among the first direction and the second direction. The selector may select the direction to be used according to a type of the imaging optical system or based on optical axis information regarding a position of an optical axis of the imaging optical system that is different from a center of the image sensor. Moreover, the selector may select the direction to be used according to a user setting. The image pickup apparatus can accept the user setting through various operation members, such as the touch panel 109 and other operation members 230.

Each example can provide an image pickup apparatus that can provide a highly accurate focus detecting result in using an imaging optical system whose optical axis is not located at the center of an image sensor, for example, in a case where two imaging optical systems are arranged in parallel.

This application claims priority to Japanese Patent Application No. 2023-126030, which was filed on Aug. 2, 2023, and which is hereby incorporated by reference herein in its entirety.

What is claimed is:
1. An image pickup apparatus comprising:
an image sensor configured to capture an object image formed by an imaging optical system, and to acquire a first pair of signals generated by light beams that have passed areas in an exit pupil that are different from each other and arranged in a first direction and a second pair of signals generated by light beams that have passed areas in the exit pupil that are different each other and arranged in a second direction different from the first direction; and
a selector configured to select a direction to be used for focus control of the imaging optical system among the first direction and the second direction
wherein the selector selects the direction to be used based on optical axis information regarding a position of an optical axis of the imaging optical system that is different from a center of the image sensor and information regarding a position of the center of the image sensor.

2. The image pickup apparatus according to claim 1, wherein the selector selects the direction to be used according to a type of the imaging optical system.

3. The image pickup apparatus according to claim 1, further comprising a determining unit configured to acquire signals among the first pair of signals and the second pair of signals, which correspond to a selected direction, and to determine a defocus amount to be used for the focus control according to acquired signals.

4. The image pickup apparatus according to claim 3, wherein in a case where the imaging optical system is of a type having two optical systems arranged in parallel, the determining unit determines the defocus amount to be used for the focus control of the imaging optical system by using the first pair of signals.

5. The image pickup apparatus according to claim 1, wherein the imaging optical system is attachable to and detachable from the image pickup apparatus.

6. The image pickup apparatus according to claim 1, wherein the selector selects the direction to be used further based on information regarding a direction of the position of the optical axis of the imaging optical system relative to the center of the image sensor.

7. The image pickup apparatus according to claim 1, wherein the selector selects the direction to be used further based on reliability of focus detection using each of the first pair of signals and the second pair of signals.

8. The image pickup apparatus according to claim 7, wherein the selector acquires optical information on the imaging optical system, and determines the reliability using the optical information.

9. The image pickup apparatus according to claim 1, wherein the imaging optical system includes two optical systems arranged in parallel,
wherein each of the two optical systems has the optical axis at the position different from the center of the image sensor, and
wherein the optical axis information is information regarding the position of the optical axis of each of the two optical systems.

10. The image pickup apparatus according to claim 1, wherein the imaging optical system has a configuration in which at least part of the optical axis moves to a position different from the center of the image sensor, and
wherein the optical axis information is information regarding a position of the at least the part of the optical axis.

11. The image pickup apparatus according to claim 1, wherein the image pickup apparatus is configured to drive the image sensor in a direction orthogonal to the optical axis.

12. The image pickup apparatus according to claim 1, wherein the selector selects the direction to be used according to a user setting.

13. A focus detecting method for an image pickup apparatus including an image sensor configured to capture an object image formed by an imaging optical system, the focus detecting method comprising the steps of:

acquiring from the image sensor a first pair of signals generated by light beams that have passed areas in an exit pupil that are different from each other and arranged in a first direction and a second pair of signals generated by light beams that have passed areas in the exit pupil that are different each other and arranged in a second direction different from the first direction; and selecting a direction to be used for focus control of the imaging optical system among the first direction and the second direction wherein the selecting step selects the direction to be used based on optical axis information regarding a position of an optical axis of the imaging optical system that is different from a center of the image sensor and information regarding a position of the center of the image sensor.

14. A non-transitory computer-readable storage medium storing a program that causes a computer to execute the focus detecting method according to claim 13.

* * * * *